United States Patent [19]
Foladare et al.

[11] Patent Number: 5,982,774
[45] Date of Patent: *Nov. 9, 1999

[54] INTERNET ON HOLD

[75] Inventors: Mark Jeffrey Foladare, Kendall Park; Steven Howard Goldman, East Brunswick, both of N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/625,963

[22] Filed: Apr. 1, 1996

[51] Int. Cl.$^6$ ............................ H04L 12/66; H04L 12/28; H04M 3/42

[52] U.S. Cl. .................... 370/401; 370/352; 370/389; 370/404; 370/427; 379/215; 379/216; 379/217; 379/218

[58] Field of Search ........................ 370/352, 353, 370/380, 389, 392, 396, 401, 404, 427, 435, 450, 465, 485; 379/90.01, 93.01, 93.05, 93.09, 100.15, 100.16, 215, 216, 217, 218

[56] References Cited

U.S. PATENT DOCUMENTS

| | | | |
|---|---|---|---|
| 5,220,599 | 6/1993 | Sasano et al. | 379/142 |
| 5,263,084 | 11/1993 | Chaput et al. | 379/215 |
| 5,327,486 | 7/1994 | Wolff et al. | 379/96 |
| 5,400,393 | 3/1995 | Knuth et al. | 379/88 |
| 5,418,846 | 5/1995 | Yuasa | 379/215 |
| 5,432,616 | 7/1995 | Fukao et al. | 358/434 |
| 5,513,251 | 4/1996 | Rochkind et al. | 379/93 |
| 5,519,767 | 5/1996 | O'Horo et al. | 379/97 |
| 5,557,658 | 9/1996 | Gregorek et al. | 379/67 |
| 5,557,659 | 9/1996 | Hyde-Thomson | 379/88 |
| 5,610,910 | 3/1997 | Focsaneanu et al. | 370/351 |
| 5,742,670 | 4/1998 | Bennett | 379/142 |
| 5,805,587 | 9/1998 | Norris et al. | 370/352 |

FOREIGN PATENT DOCUMENTS

| | | | |
|---|---|---|---|
| WO 95/34153 | 6/1995 | WIPO | H04L 29/06 |
| WO 96/05684A1 | 7/1995 | WIPO | H04M 3/22 |

OTHER PUBLICATIONS

Publication No. 08032682, published Feb. 2, 1996, by H. Yutaka.

*Primary Examiner*—Fan S. Tsang
*Assistant Examiner*—Allan Hoosain

[57] ABSTRACT

A user connected to the Internet (102), over his or her telephone line (105), through an Internet Access Provider (IAP) (104) can place the Internet connection on hold to take an incoming telephone call from a calling party at a telephone set (110). The user is informed of the waiting call by means of a signal send by the Local Exchange Carrier (LEC) (103) to the IAP that indicates the presence of the waiting call and the identity of the calling party. This information is then transmitted by the IAP to the user's terminal (101). Upon an affirmative decision to take the call, indicated to the IAP by means of a "click" on the screen of the user's terminal, the call to the IAP is placed on hold and the incoming call is connected to the user's telephone set (111).

15 Claims, 3 Drawing Sheets

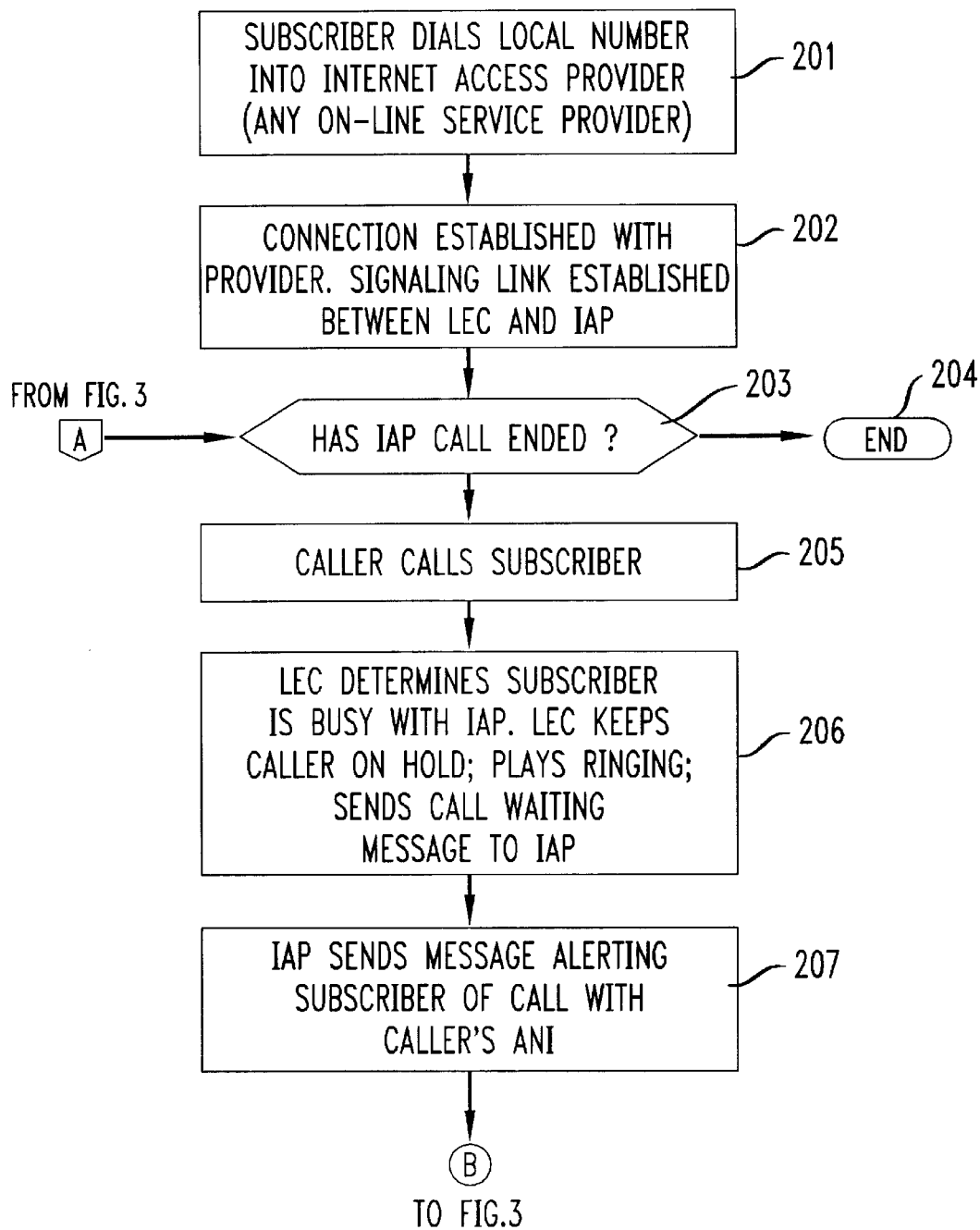

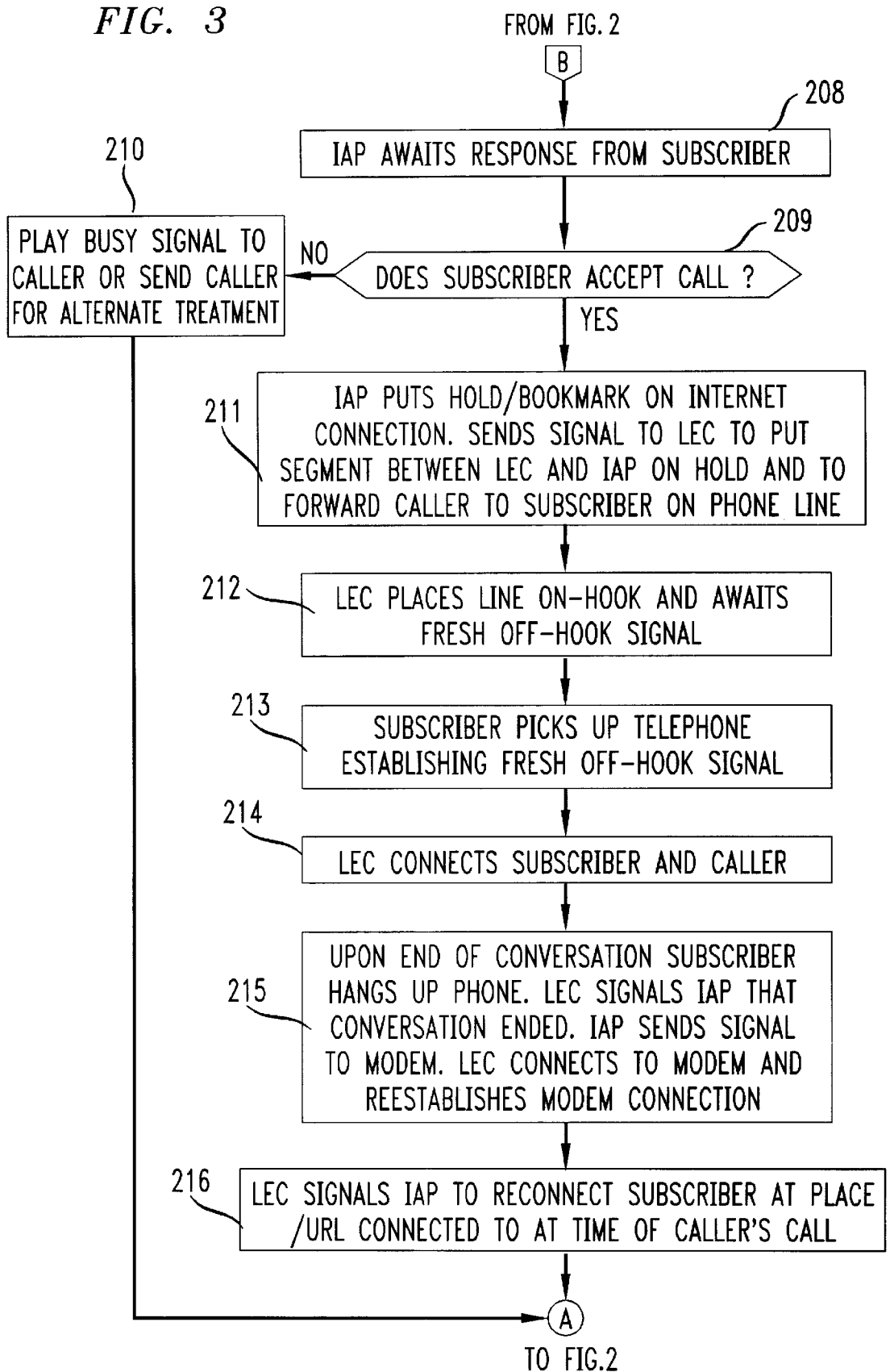

5,982,774

INTERNET ON HOLD

TECHNICAL FIELD

This invention relates to providing a user with the capability of placing an existing Internet connection on hold to take an incoming telephone call on the same telecommunications facilities over which the Internet connection is made.

BACKGROUND OF THE INVENTION

Most users today connect their computer terminals to the Internet over a telephone line through their Local Exchange Carrier (LEC) to an Internet Access Provider (IAP), which provides access to the Internet and connection to a plethora of various Internet Service Providers (ISPs) that offer information and interactive services. Modems operating at rates such as 14.4 kbps or 28.8 kbps are available to connect a user's terminal to the telephone line for transport of data to and from the IAP, and thus the Internet and the ISPs.

As more and more information and services have been made available over the World Wide Web, people are spending more and more time "surfing the Net", and thus tying up their telephone line. If an Internet user has only a single telephone line, callers trying to reach such a user may not find it uncommon to get a busy signal for hours on end. Call Waiting services available from local telephone companies, which allow a subscriber to answer an incoming call from a second party while conversing with a first party cannot be used while a user is engaged in an Internet call since the user is not made aware of the incoming call and has no ability to switch his or her connection to the Internet to take the telephone call. In fact, a service such as Call Waiting must be disabled by the user prior to placing an Internet call to prevent a Call Waiting alerting tone from causing the user's modem to drop the telephone connection to the IAP.

SUMMARY OF THE INVENTION

In accordance with the present invention, a user connected to the Internet through an Internet Access Provider can place the Internet connection on hold in order to take an incoming telephone call. The IAP is informed of the waiting call for the user by means of a signal sent by the LEC to the IAP on a signaling channel that indicates the presence of the waiting call for a user, and which may also indicate caller identification information including the calling party's telephone number and/or a name associated with that calling number. This information is then transmitted back to the user's terminal on the LEC-IAP Internet phone connection by the IAP for display on the user's terminal and action by the user. Upon the user's decision to take the incoming call, signaled to the IAP, for example, by the user by clicking on an "accept" icon, the Internet phone connection is placed on hold and the incoming call is forwarded to the user. Upon completion of the telephone conversation, the user may hang up the telephone and reestablish the Internet telephone connection at the same place/URL address at which he or she was at the time the Internet connection was placed on hold.

BRIEF DESCRIPTION OF THE DRAWINGS

FIGS. 2 and 3, when placed together as shown in FIG. 4, show a call flowchart that details the steps that enable a user's Internet call to be placed on hold in order to take an incoming telephone call, in accordance with the present invention.

DETAILED DESCRIPTION

Figure 1:
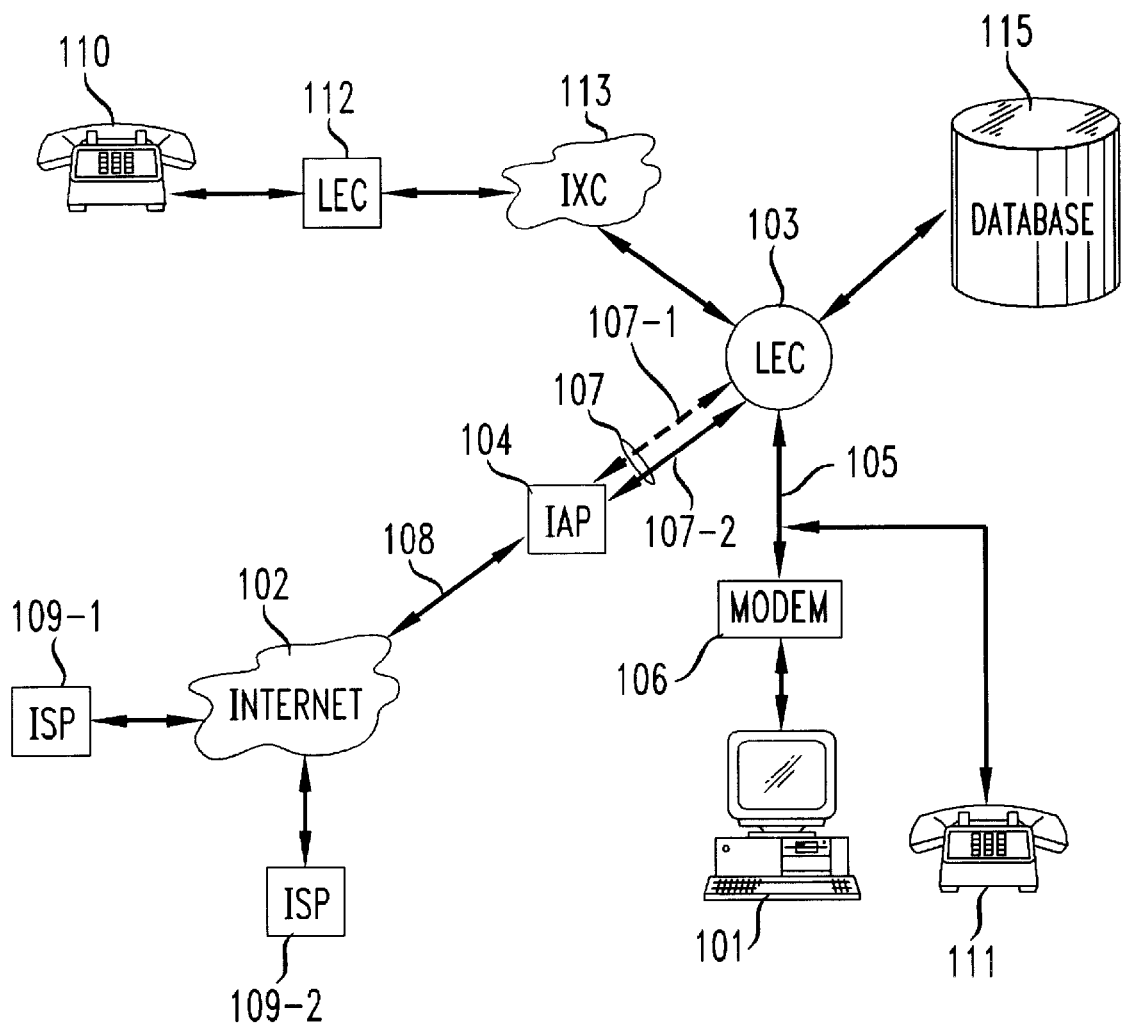
FIG. 1 is a block diagram showing a system that incorporates the present invention.

With reference to FIG. 1, a user at terminal 101 is connected through his or her Local Exchange Carrier (LEC) 103 to Internet Access Provider (IAP) 104 and from there to the Internet 102. IAP 104 may be a large, nationally known, provider, such as America Online, or a smaller more local IAP. The telephone connection 105 between terminal 101 and LEC 103 is typically a POTS telephone line. A modem 106, which may be built into the terminal 101, is required for transmitting and receiving digital data over an ordinary POTS telephone line 105. The LEC is connected to IAP 104 over telephone facilities 107, which generally are a high capacity telephone line, such as a T1 line, with a Primary Rate Interface (PRI), capable of handling multiple mutual customers of the LEC and the IAP. With respect to the latter, the connection 107 may consist of 47 64 kbps B-channels and a single 64 kbps D-signaling channel. The signaling channel is represented by the dotted line 107-1 and the multiple data channels are represented by the single solid line 107-2. Although the user's terminal 101 and IAP 104 are shown associated with the same LEC 103, if terminal 101 and IAP 104 are not both associated with the a common LEC, then the data call will transit an Interexchange Carrier (IXC) network to the LEC associated with the IAP, and from there to the IAP.

IAP 104 connects to the Internet 102 over a high capacity digital line 108, such as a T1 line with Frame Relay or ATM switching. As determined by the URL address requested by the user on his or her terminal, the user may access ISPs such as 109-1 and 109-2 connected, for example, on the World Wide Web (WWW). During a session, a user likely will "surf the Net" accessing those ISPs that provide information and/or services that he or she finds of interest. As is well known in the art, each screen of information provided to the user frequently includes pointers to other URL addresses that might be related to the screen currently being perused. With so many links available to the user, the user may easily surf the Net for many hours during one Internet session in order to satisfy his or her curiosity. During such time, a user is unavailable to take incoming phone calls if he or she has only a single telephone line, even if he or she subscribes to the service commonly known as Call Waiting. In fact, in order to ensure that an alerting tone of an incoming call does not cause the modem to disconnect the ongoing Internet call, the Call Waiting feature must be blocked. A calling party, without benefit of the present invention, may thus hear a busy signal for hours on end while the user surfs the Net.

In accordance with the present invention, a caller from telephone set 110, upon dialing the telephone number associated with the user at terminal 101/telephone set 111, may be connected to the user's telephone set if such user subscribes to an expanded Internet On Hold Call Waiting service, and the user elects to place the Internet call on hold to answer the incoming call. The call from telephone set 110 is transmitted through the caller's LEC 112 and over an IXC network 113, if the caller at telephone set 110 and the user at terminal 101 are associated with different LECs. The call is then transmitted from IXC 113 to the user's LEC 103. A database 115 associated with LEC 103, maintains a record for each of its associated telephone numbers, which contains information indicating whether that number is subscribed to an Internet On Hold Call Waiting service, a normal Call Waiting service, or is not subscribed to any Call Waiting service. The record furthermore includes the current status of the telephone line. Thus, when the subscriber to an Internet On Hold Call Waiting service at terminal 101 launches an Internet call through LEC 103 to IAP 104, a "smart" LEC can determine from the number dialed that the user has placed a call to an IAP. The LEC can thus update the user's the data record in database 115 to indicate the status of the telephone line as being on an Internet call. If LEC 103 is not a "smart" LEC, but a "dumb" LEC, and thus not capable of determining from the number dialed that a call has been launched to an IAP, IAP 104 upon receipt of the call sends a message over the signaling channel 107-1 to LEC 103 indicating the telephone number of the user and the status of that number, from which that number's record in database 115 is updated.

Upon receipt of a telephone call from station set 110 to the telephone number associated with the user at terminal 101/station set 111, LEC 103 determines whether the telephone line 105 is off-hook, and if so accesses database 115 to determine the type of call the user is on. If the user is not a subscriber to any type of Call Waiting service and is off-hook, the calling party receives a normal busy signal. If the user subscribes to a normal Call Waiting service, a normal Call waiting beep is transmitted to the user if the user is offhook, unless the user has blocked Call Waiting. If the user is a subscriber to an Internet On Hold Call Waiting service, and telephone line 105 is busy and database 115 indicates that the user is on an Internet call, then a signal is sent by LEC 103 over signaling channel 107-1 to IAP 104 that identifies the called party and the calling party at station set 110 by either his or her Automatic Number Identification (ANI) or Caller ID, and optionally provides the name of the caller as determined by ANI or Caller ID. Upon receipt of such a message, IAP 104 sends a message to the user's terminal 101 on, for example, a new page, a new window within a current page, or an over-write within the current page, that indicates the presence of a waiting call and the identity of the caller.

The user at terminal 101, upon receipt of the call waiting message has the option of ignoring the call, rejecting the call, or placing the Internet call on hold and taking the incoming call. If the user takes the call by "clicking", for example, on an "accept" icon, such acceptance is received by IAP 104 and transmitted back over signaling channel 107-1 to LEC 103. LEC 103, upon being signaled by IAP 104 that the user wants to accept the incoming call, disconnects the current data call between LEC 103 and modem 106 and places line 105 on-hook and rings station set 111. After receiving a ringing signal, user picks up station set 111 to commence the conversation with the caller, while maintaining the Internet connection on hold. If modem 106 has voice capabilities and terminal 101 has both a microphone and speaker (not shown), then the computer terminal itself may act as the telephone station set.

Once the user at terminal 101/station set 111 indicates that he or she will take the call from station set 110, the return ringing signal at station set 110 can continue until the user goes off-hook at station 111. Alternatively, the LEC 103 will provide an audio message informing the calling party that the called party is going to accept the call shortly, and requesting the calling party to await connection. During this interval ringing may either continue or be discontinued. The user at terminal 111, upon going off hook can be immediately connected to the calling party. Alternatively, the user at station set 111 may be required to push a touch-tone button to indicate to LEC 103 that he or she is ready to be connected to the call. Until receipt by the LEC of a such touch-tone signal, the calling party may continue to hear ringing. Upon receiving the touch-tone signal, LEC 103 connects the calling party to the user.

At the conclusion of the conversation, the user hangs up station set 111, returning line 105 to an on-hook state. LEC 103 thereupon detects the on-hook state of line 105 and sends a signal to IAP 104 to prepare IAP to return the Internet connection to the URL address to which it was connected at the time the user accepted the incoming telephone call. Alternatively, the user may dial into the provider, which will bring him or her to the last dialed place. LEC 103 also sends a signal over line 105 for detection and subsequent reconnection of modem 106. Depending on the type of modem, upon concluding the voice call, the user may need to manually reset modem 106 to answer the next call. Upon reconnection to the Internet call, the Internet session continues. At the conclusion of the session, LEC 103 changes the state of line 105 in database 115 to on-hook.

With reference to FIGS. 2 and 3, a chart of a call flow that incorporates the method of the present invention begins at step 201 when the subscriber/user dials a local telephone number to reach an Internet Access Provider. A connection is established with the IAP and a signaling link is established between the LEC and IAP at step 202. The call flow remains at decision branch 203 until the Internet call with the IAP ends, whereupon the call flow ends at step 204. The call flow passes to step 205, however, upon an earlier call to the user/subscriber from a calling party. At step 206 the subscriber's LEC determines that the subscriber is busy with an Internet call to the IAP and keeps the caller on hold while playing ringing and sending a call waiting message to the IAP. At step 207, the IAP sends a message alerting the subscriber of the waiting call together with the caller's ANI. The IAP awaits the response from the subscriber at step 208. At decision step 209, the subscriber either accepts or rejects the call. If the subscriber rejects the call, at step 210 either a busy signal is played to the caller or the call is sent for an alternate treatment, such as to a messaging service. Call flow then returns to decision branch 203 to await the conclusion of the Internet call to the IAP or a next incoming call. If, at decision branch 209, the subscriber accepts the call, at step 211 the IAP puts a hold/bookmark on the Internet connection and sends a signal to the LEC to put the call segment between the LEC and the IAP on hold and to forward the new call to the subscriber over the phone line. At step 212 the LEC places the telephone line to the subscriber on-hook and awaits a fresh off-hook signal. At step 213, the subscriber picks up the telephone, establishing a fresh off-hook signal. The caller is then connected to the subscriber at step 214. Upon the conclusion of the conversation, at step 215, the subscriber hangs up the telephone and the LEC signals the IAP that the conversation has ended. The LEC thereupon connects to the modem and reestablishes the modem connection. At step 216, the LEC signals the IAP to reconnect the subscriber at the place/URL address at which he or she was connected at the time of the caller's call. The call flow then returns to decision step 203 awaiting the end of the Internet call through the IAP or another call from a caller to the subscriber.

Although described hereinabove in connection with a call from a user/subscriber to an Internet Access Provider, the present invention could be applied in conjunction with any type of data connection in which the data provider and the LEC cooperate with each other in the way described above. Furthermore, although described as placing a call on the Internet on hold to take an incoming voice call, the present invention could be applied to placing on hold a call over any Internet-like packetized switched data network to which a user is connected through an access provider. Furthermore, the call over the Internet or Internet-like packetized switched data network can be a data call, a voice call using software currently available for making voice calls over the Internet, or a multimedia call. In addition, the incoming call may not necessarily be a voice call, but could be any type of call, data or otherwise, such as a FAX message, directed over the public switched-telephone network to the user while the user is connected to the Internet or Internet-like network. Thus term "calling party" as used herein is intended to mean the originator of the call, be it man, woman, or machine.

The above-described embodiment is illustrative of the principles of the present invention. Other embodiments could be devised by those skilled in the art without departing from the spirit and scope of the present invention.

The invention claimed is:

1. A method of connecting an incoming call over a communication network from a calling party to a communication line of a called party while a call is ongoing on the same communication line between a terminal and an access provider to the Internet or an Internet-like packet-based data network, the method comprising the steps of:

receiving the incoming call from the calling party in the communication network;

signaling the access provider that the called party has an incoming call;

signaling the terminal on the same communication line on the call between the terminal and the access provider that the incoming call for the called party is present in the communication network;

receiving from the terminal over the same communication line a signal to accept the incoming telephone call;

disconnecting the call between the terminal and the access provider;

retaining a URL address to which the terminal is connected when the call is on hold;

connecting the incoming call over the same communication line; and connecting the terminal back to the access provider when the incoming call is concluded.

2. The method of claim 1 wherein the call between the terminal and the access provider resumes at the retained URL address when the terminal is connected back to the access provider.

3. The method of claim 1 wherein the step of signaling the terminal that the incoming call is present includes the step of providing the identity of the calling party.

4. The method of claim 3 wherein the identity of the calling party includes the automatic number identification of the calling party.

5. The method of claim 3 wherein the identify of the calling party includes the name of the calling party.

6. A method of establishing a connection over a public-switched telephone network from a calling party to a telephone line of a called party while the same telephone line is busy on another call on the public-switched network between a terminal and connected an Internet Access Provider (IAP) that is connected to Internet, the method comprising the steps of:

receiving an incoming call for the called party from the calling party in the telephone network;

signaling the IAP that the called party has an incoming call;

signaling the terminal on the same telephone line on the call between the IAP and the terminal that the incoming call for the called party is present in the telephone network;

receiving from the terminal over the same telephone line a signal to accept the incoming call;

disconnecting the call to the IAP;

retaining a URL address to which the called party is connected when the call to the IAP is disconnected;

connecting the incoming call for the called party over the same telephone line; and connecting the terminal back to the IAP when the incoming call is concluded.

7. The method of claim 6 wherein upon connecting the terminal back to the IAP, the call resumes at the retained URL address.

8. The method of claim 6 wherein the step of signaling the terminal that the incoming call is present includes the step of providing the identity of the calling party.

9. The method of claim 8 wherein the identity of the calling party includes the automatic number identification of the calling party.

10. The method of claim 8 wherein the identity of the calling party includes the name of the calling party.

11. A method of connecting an incoming telephone call from a calling party to a called party over a public-switched telephone network comprising the steps of:

receiving the incoming telephone call in the public-switched telephone network that is directed to a telephone line of the called party;

determining when the incoming telephone call is received if the telephone line of the called party is busy on a telephone call with a service provider which provides access to the Internet or Internet-like packet-based network;

signaling the service provider that the called party has a telephone call if it is determined that the same telephone line of the called party is busy on a telephone call with the service provider;

signaling on the call with the service provider that the incoming call for the called party is present in the public-switched telephone network;

receiving from over the same telephone line a signal to accept the in coming call;

disconnecting the call with the service provider;

retaining a URL address to which the called party is connected back to the access provider when the incoming call is concluded;

connecting the incoming call to the called party over the same telephone line; and connecting the called party back to the access provider when the incoming call is concluded.

12. The method of claim 11 wherein the call to the access provider resumes at the retained place.

13. The method of claim 11 wherein the step of signaling that the incoming call for the called party is present includes the step of providing the identity of the calling party.

14. The method of claim 13 wherein the identity of the calling party includes the automatic number identification of the calling party.

15. The method of claim 13 wherein the identity of the calling party includes the name of the calling party.

* * * * *